United States Patent [19]

Bridgstock

[11] Patent Number: 5,129,636
[45] Date of Patent: Jul. 14, 1992

[54] PIPE CLAMPS
[75] Inventor: Eric Bridgstock, Hope, England
[73] Assignee: Fusion Group plc, Chesterfield, England
[21] Appl. No.: 696,608
[22] Filed: May 7, 1991
[30] Foreign Application Priority Data May 11, 1990 [GB] United Kingdom ............... 9010622

[51] Int. Cl.⁵ ................................................ B25B 1/20
[52] U.S. Cl. .......................................... 269/43; 269/24; 269/45; 269/69; 29/281.1
[58] Field of Search ................... 269/43, 24, 32, 45, 269/58, 69; 29/281.1

[56] References Cited

U.S. PATENT DOCUMENTS 4,769,889 9/1988 Landman et al. ................... 269/43
4,893,393 1/1990 Marshall ............................ 29/237

Primary Examiner—Bruce M. Kisliuk
Assistant Examiner—Eileen Morgan
Attorney, Agent, or Firm—Trexler, Bushnell, Giangiorgi & Blackstone, Ltd.

[57] ABSTRACT

The invention relates to pipe clamps and is particularly concerned with equipment that combines ease of handling and transportation and which can ensure correct alignment of curved, polyethylene pipe ends and their presentation to an appropriate coupling means. This objective is met by a construction comprising first and second clamp means, said first clamp means being pivotally secured at or towards one end of an inflexible, extendible means, and said second clamp means being pivotally secured at or towards the opposite end of said extendible means, the free ends of the clamp means being detachably and pivotally secured to each other.

1 Claim, 2 Drawing Sheets

PIPE CLAMPS

This invention relates to pipe clamps.

The employment of polyethylene as the material for pipelines for gas and water distribution is now commonplace taking advantage of its important characteristics. In particular, the flexibility of polyethylene allows pipes formed from it and up to large diameters to be coiled at the point of manufacture for ease of handling and transportation that that provides. The disadvantage of this is that the coiling of polyethylene pipes induces a curvature in the pipe.

Thus, on site and with one pipe laid e.g. in a trench, and the next pipe length coiled on a drum and ready for laying, the respective ends of the laid pipe and the coiled length are each curved, with an inevitable attendant difficulty in bringing the pipe ends together for jointing, by any one of the usual polyethylene pipe jointing techniques, electrofusion, butt fusion or socket fusion, all of which are very reliant on accurate pipe end alignment for the creation of an acceptable joint. This has led to the development of large and heavy clamping systems and alignment rigs that are inconvenient and slow to use and require considerable manpower for their effective use.

The object of the present invention is to provide a pipe clamp that enables the accurate alignment of pipe ends and avoids those disadvantages mentioned above.

According to the present invention, a pipe clamp comprises first and second clamp means, said first clamp means being pivotally secured at or towards one end of an inflexible, extendible means, and said second clamp means being pivotally secured at or towards the opposite end of said extendible means, the free ends of the clamp means being detachably and pivotally secured to each other.

Preferably pipe clamps are located on clamp supports, the clamp supports being pivotally attached to the extendible means, and to each other. Further preferably two support arms are provided for each clamp with cooperating support arms each pivotally secured to opposite ends of two inflexible extendible means.

Preferably, the extendible means is a piston and cylinder, with one clamp support pivotally connected to the closed end of the cylinder, and the other clamp support pivotally secured to the end of the piston rod emerging from the cylinder.

Further preferably, the free ends of the clamp supports are held together by a removable pivot pin.

Thus, with the clamp supports disconnected from each other, each can be freely pivoted about its connection to the extendible means to put its clamp in a disposition to receive the end of a pipe, substantially irrespective of any particular upwardly angular disposition of a pipe end, e.g. extending out of a trench, or extending from a coiled length. With the pipe ends clamped in the clamps, the clamp supports can be swung with relative ease about their pivotal connections to the extendible means, to permit their pivotal connection together. The extendible means can then be extended, as a result of which, the clamp supports are brought into alignment and consequentially, the pipe ends brought into an aligned co-axial condition, to permit their successful jointing.

In accordance with a second aspect of the invention, the pipe clamp as defined above is provided with a second and highly advantageous function.

According to a second aspect of the invention, a pipe clamp comprises first and second clamp means, said first clamp means being pivotally secured at or towards one end of an inflexible, extendible means, and said second clamp means being pivotally secured at or towards the opposite end of said extendible means, the free ends of the clamp means being detachably pivotally secured to each other, and there being means to secure the clamp means in their aligned position and to permit relative longitudinal movement of the clamp means, and whereby with the pivotal connection of the clamp means to each other disconnected, a contraction of the extendible means causes the pipe clamps to be drawn towards each other.

Thus, with the pipe ends secured in the clamps, the ability for the pipe ends to be brought into axial alignment and be brought into engagement with either each other or an interposed connecting socket, by the same relatively simple and easily operated pipe clamp of the invention, constitutes a significant improvement in the handling of polyethylene pipes on site.

When pipe clamps are located on clamp supports they may simply be of rectangular bar shape, and a slip ring may be provided on one or both support bars. With the slip rings drawn rearwardly of the clamp supports, the first function of the pipe clamp of the invention, easy securing of the pipe ends in the clamps can be effected, and with the clamp supports aligned, the slip rings can be brought forward to lock the ends of the supports together, and permit the removal of their pivotal connection to each other and enable the second function of the invention to be performed. Alternatively a support block may be provided on one support arm of each cooperating pair of support arms and a roller pin removably secured to each support block, the support blocks and roller pins combining to form a guide for the support arms. Thus at the onset of operations, and with the ends of the support arms pivotally secured together, the roller pins can be removed and the extendible means contracted to cause the pivoting of the clamp supports on the extendible means and the folding of the clamp supports about their pivotal connection together to put the clamps in a condition where the pipe ends can be connected to the clamps. The extendible means are then extended to cause opposite pivoting of the clamp supports and to bring the clamp supports into alignment and when the roller pins are replaced to form guides for the clamp supports. The pivotal connection between the supports is then removed and the extendible means contracted to cause the clamps and hence pipe ends to move towards each other and enable connection of the pipe ends.

One embodiment of the invention will now be described with reference to the accompanying drawings, in which.

Figure 1:
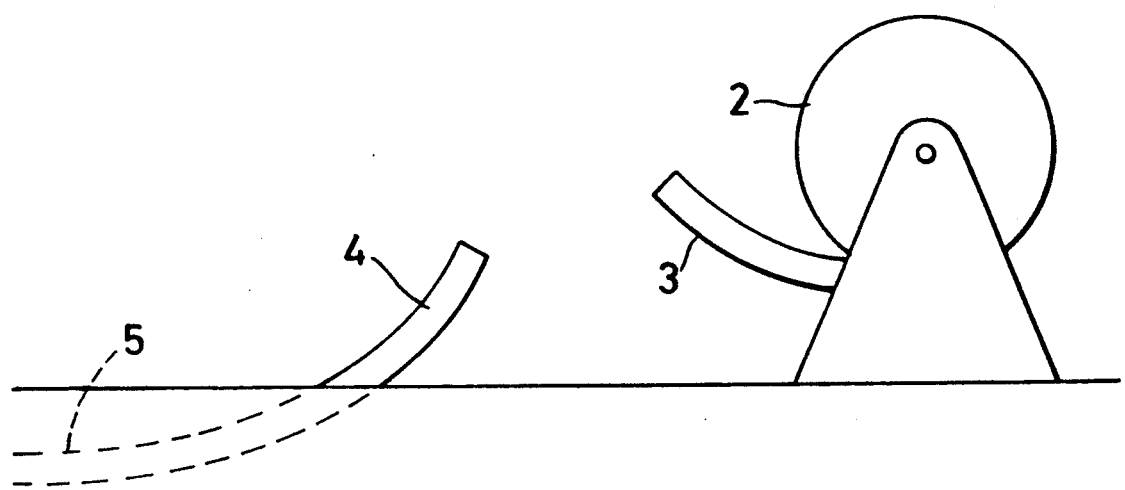
FIG. 1 is a schematic representation showing the general disposition of pipe ends requiring connection.

As is illustrated in FIG. 1, it is ordinarily the case that polyethylene pipe lengths 1 are coiled on a drum 2 at their point of manufacture, and with consequent inducing of curvature of the coiled pipe. Thus, as is shown in FIG. 1, the free end 3 of the coiled pipe assumes an upward curved disposition, as does the end 4 of a laid pipe 5, and to which the coiled pipe is to be attached.

Figure 2:
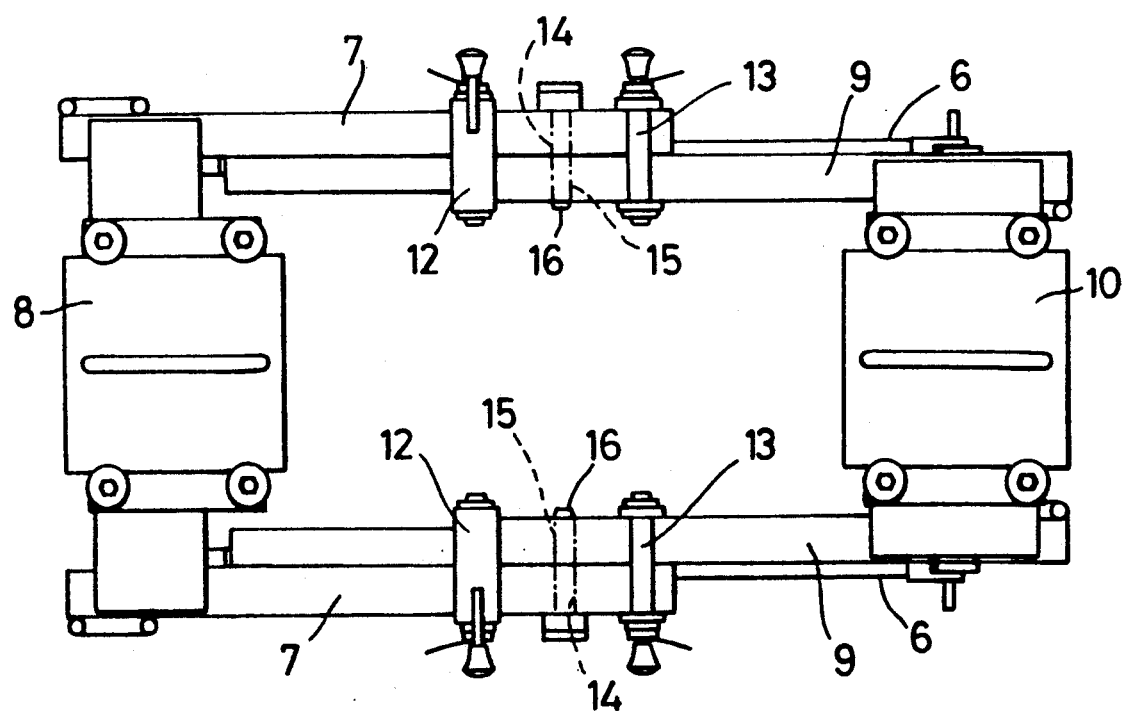
FIG. 2 is a plan view of equipment in accordance with the invention.
Figure 3:
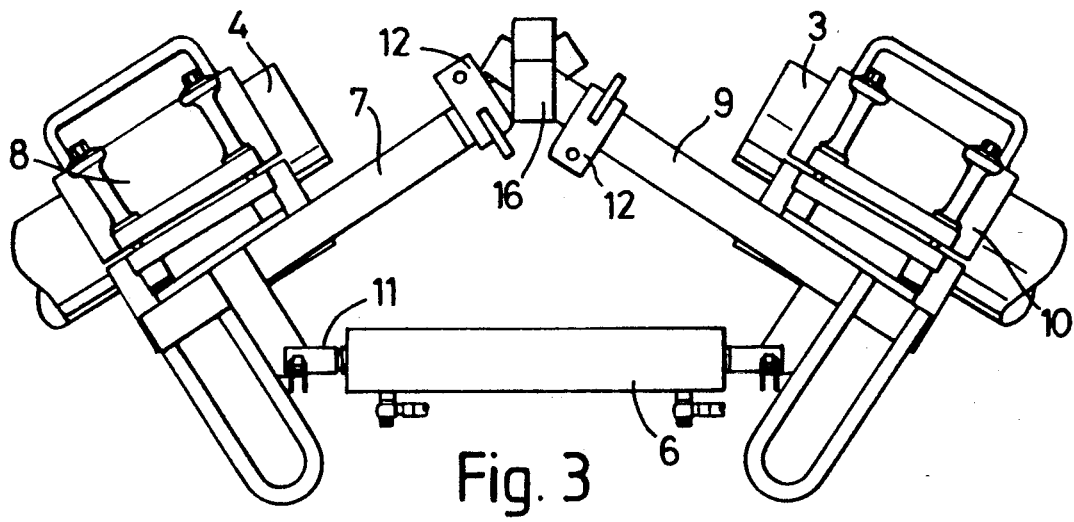
FIG. 3 shows the equipment of FIG. 2 at the point of connection to the pipe ends.
Figure 4:
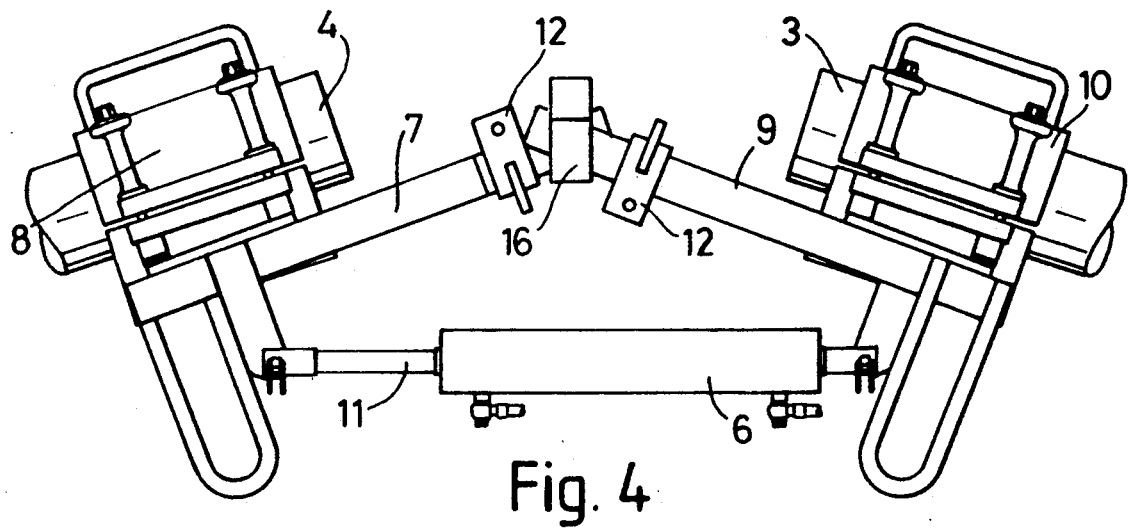
FIG. 4 shows the equipment at an intermediary stage in bringing the pipe ends into alignment.
Figure 5:
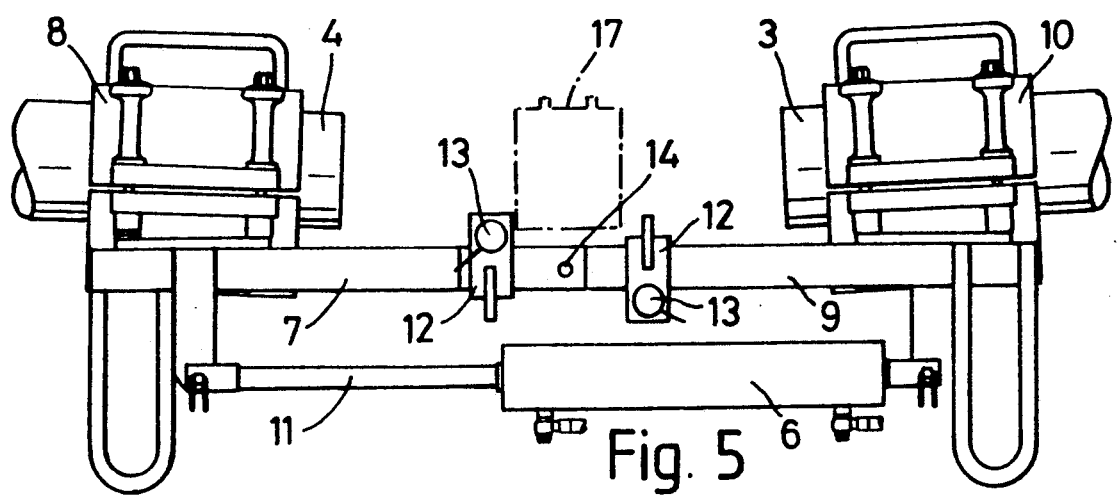
FIG. 5 shows the equipment of the invention at the stage where the pipe ends are in alignment.

As is illustrated in FIGS. 2 to 4, equipment enabling the accurate aligning of the pipe ends 3 and 4 comprises a double-acting piston and cylinder unit 6 to each side a rectangular-sectioned support arm 7 for a clamp 8, pivotally secured to the ends of the cylinders 6, and a rectangular-sectioned support arm 9 for a clamp 10 pivotally secured to piston rods 11 extending from the cylinders. Each clamp is of the type where a bottom clamp member is fixed to its respective arm, and a top clamp member removably secured to the bottom clamp member. Each of the support arms 7 and 9 is provided with a mounting member 12 for a removable roller pin 13 and towards their free ends, each arm 7 and 9 is provided with a respective co-operating hole 14, 15, to receive a pivot pin 16. Thus, and as shown in FIG. 2, the roller pins 13 are removed, and each arm 7 and 9 swung about its pivotal connections by withdrawing the piston within the cylinder, to fold the arms 7 and 9 about the pivot pin 16 to enable the pipe end 3 and the pipe end 4 to engage in and be secured to the respective clamps 8 and 10, with the pipe end 4 projecting beyond the clamp 8 and the pipe end 3 projecting beyond the clamp 10.

The piston and cylinder units are then activated by admitting pressure fluid to the cylinders 6 to drive the piston rods 11 out of the cylinders, and when the pivotal connections of the arms 7 and 9 to the cylinders and to the piston rods and the pivotal connection of the arms to each other by the pin 16 progressively brings the arms into alignment, as is shown by FIGS. 3 and 4, and hence brings the pipe ends into alignment, as is shown by FIG. 4.

When the arms 7 and 9 are in alignment, the roller pins are replaced to bridge the overlapping arms, and at this point, the pin 16 is removed. Pressure fluid is then admitted to the cylinders 6 to drive the pistons in the opposite direction and hence retract the piston rods within the cylinders, and because of the connections between the arms 7 and 9 and the cylinders 6 and piston rods, and the slidable engagement between the arms 7 and 9 and the roller pins 13, the result is that the clamps 8 and 10 and hence the pipe ends 3 and 4 are held in axial alignment as they are urged towards each other. Thus, by providing a suitable coupling member 17 between and in axial alignment with the pipe ends, the pipe ends can be driven into enagement with the coupling member. A coupling member of known character such as, for example, a coupling sleeve of the known electrofusion type, can readily be employed.

Once the pipe ends have been coupled together, it is simply a case of releasing the pipe ends from the clamps by disconnecting the respective top clamp member, and then the equipment of the invention can readily be transported to the next location where the end of a coiled pipe is to be connnected to the end of a laid pipe.

What I claim is:

1. A pipe clamp comprising first and second clamp members to encircle and engage a respective pipe end, said first clamp member being pivotally secured at or towards one end of an inflexible extendible means and said second clamp member being pivotally secured at or towards the opposite end of said extendible means, there being at least one arm extending from each clamp member, said arms overlapping each other at their inner ends and pivotally secured together by a removable pivot pin means, and there being mounted on each arm towards its inner end a location block for a removable roller pin, the position of each location block on its respective arms being such that with the arms in alignment, the innermost end of one arm extends beyond the position of axis of the roller pin on the location block of the other arm, the arrangement being such that in a first condition and with the pivot pin in place and the roller pins removed, a contraction of the inflexible extendible means causes the clamp members to be brought towards each other with consequential pivoting of the arms about the pivot pin, and an extension of the extendible means causes the clamp members to be carried away from each other with consequential opposite pivoting of the arms about the pivot pin until the arms are in alignment, and the arrangement being such that in a second condition, the pivot pin is removed and the roller pins located ont he location blocks and when a contraction of the extendible means causes the clamp members to be drawn towards each other with maintained axial alignment.

* * * * *